(12) United States Patent
Matsumoto et al.

(10) Patent No.: US 8,467,173 B2
(45) Date of Patent: Jun. 18, 2013

(54) ELECTRONIC DEVICE AND COMPONENT

(75) Inventors: Kyohei Matsumoto, Oume (JP); Toshio Konno, Akiruno (JP); Tomohiro Hamada, Tachikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 313 days.

(21) Appl. No.: 12/916,350

(22) Filed: Oct. 29, 2010

(65) Prior Publication Data

US 2011/0157792 A1 Jun. 30, 2011

(30) Foreign Application Priority Data

Dec. 25, 2009 (JP) ................................. 2009-296175

(51) Int. Cl.
*G06F 1/16* (2006.01)
(52) U.S. Cl.
USPC .................................................... 361/679.01
(58) Field of Classification Search
USPC ............................... 361/679.01, 679.3, 679.37
See application file for complete search history.

(56) References Cited

U.S. PATENT DOCUMENTS

| | | | | |
|---|---|---|---|---|
| 5,107,400 A * | 4/1992 | Kobayashi | ............... | 361/679.37 |
| 5,124,887 A * | 6/1992 | Kobayashi | ............... | 361/679.57 |
| 5,251,105 A | 10/1993 | Kobayashi et al. | | |
| 5,305,180 A * | 4/1994 | Mitchell et al. | .......... | 361/679.37 |
| 5,311,455 A * | 5/1994 | Ho | ............................. | 361/679.37 |
| 5,764,477 A | 6/1998 | Ohgami et al. | | |
| 6,621,715 B2 * | 9/2003 | Kitadai | ..................... | 361/679.37 |
| 6,999,307 B2 * | 2/2006 | Peng | ........................ | 361/679.37 |
| 7,502,223 B2 | 3/2009 | Tatsukami | | |
| 8,023,259 B2 * | 9/2011 | Lam et al. | ................. | 361/679.37 |
| 8,040,670 B2 * | 10/2011 | Tatsukami | ............... | 361/679.37 |
| 2009/0148638 A1 | 6/2009 | Kishi et al. | | |
| 2011/0141703 A1 * | 6/2011 | Kitamura et al. | ............. | 361/736 |

FOREIGN PATENT DOCUMENTS

| | | |
|---|---|---|
| JP | 03-171315 A | 7/1991 |
| JP | 04-062896 A | 2/1992 |
| JP | H06-062576 U | 9/1994 |
| JP | 09-297631 A | 11/1997 |
| JP | 11-191023 | 7/1999 |
| JP | 2002-158456 A | 5/2002 |
| JP | 2002-182788 A | 6/2002 |
| JP | 2007-328531 A | 12/2007 |
| JP | 2008-046882 A | 2/2008 |
| JP | 2009-009536 A | 1/2009 |
| JP | 2009-141160 A | 6/2009 |
| JP | 2009-259166 A | 11/2009 |

OTHER PUBLICATIONS

Notice of Rejection mailed by Japan Patent Office on Jan. 11, 2011 in the corresponding Japanese patent application No. 2009-296175.
Notice of Rejection mailed by Japan Patent Office on Apr. 12, 2011 in the corresponding Japanese patent application No. 2009-296175. x.

\* cited by examiner

*Primary Examiner* — Lisa Lea Edmonds
(74) *Attorney, Agent, or Firm* — Knobbe, Martens, Olson & Bear LLP

(57) ABSTRACT

According to one embodiment, an electronic device includes: a main body; a second connector; and a second engage portion. The main body includes a component container housing a component. The second connector is provided to the main body so as to face the component container, and is configured to be attached to a first connector provided at one end of the component. The second engage portion is provided to the main body, and is configured to be engaged with a first engage portion provided at other end of the component.

6 Claims, 9 Drawing Sheets

US 8,467,173 B2

ELECTRONIC DEVICE AND COMPONENT

CROSS-REFERENCE TO RELATED APPLICATIONS

This application is based upon and claims the benefit of priority from Japanese Patent Application No. 2009-296175, filed Dec. 25, 2009, the entire contents of which are incorporated herein by reference.

FIELD

Embodiments described herein relate generally to an electronic device and component.

BACKGROUND

Conventionally, there is known an electronic device that includes a component container housing a component (see for example Japanese Patent Application Publication (KOKAI) No. H11-191023). In the conventional electronic device, the component is engaged with the main body, and a connector of the component is inserted into a connector of the main body. The component is engaged with the main body in order to prevent the component from being released from the component container.

In the conventional electronic device, engage portions to be engaged with a component are provided for four locations in total, i.e., two locations at one of two pairs of opposing side faces of the component container and two locations at other one of the two pairs of opposing side faces of the component container. Accordingly, the structure of the apparatus is complicated, thereby the size of the apparatus increases.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

In general, according to one embodiment of the invention, an electronic device, comprises: a main body; a second connector; and a second engage portion. The main body comprises a component container housing a component. The second connector is provided to the main body so as to face the component container, and configured to be attached to a first connector provided at one end of the component. The second engage portion is provided to the main body, and configured to be engaged with a first engage portion provided at other end of the component.

Various embodiments will be described hereinafter with reference to the accompanying drawings. For convenience, as seen in a use state of an electronic device 1, a width direction (horizontal direction) of a first main body 2 is defined as an X direction, a depth direction of the first main body 2 is defined as a Y direction, and a thickness direction (vertical direction) of the first main body 2 is defined as a Z direction, in the following. The X axis, the Y axis, and the Z axis are perpendicular to one another.

Figure 1:
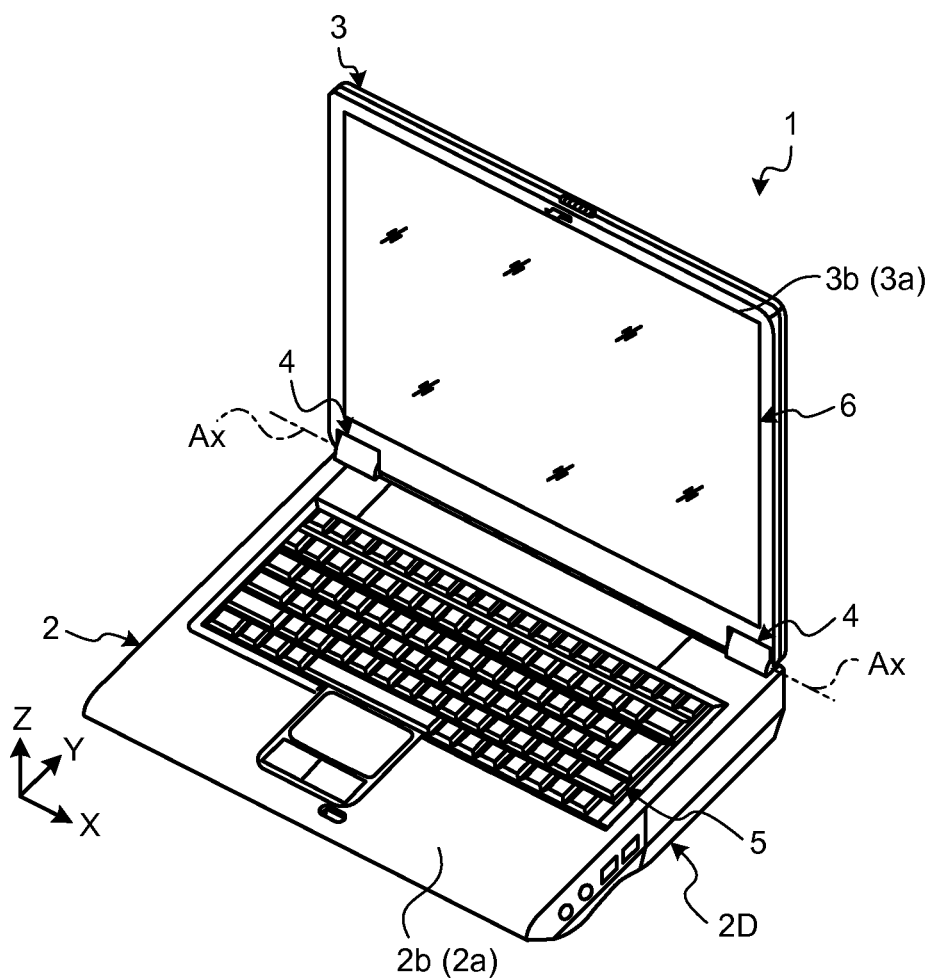
FIG. 1 is an exemplary perspective view of an electronic device according an embodiment.

An outline of the structure of the electronic device 1 will now be described with reference to FIGS. 1, 2, and the like. As illustrated in FIG. 1, the electronic device 1 according to an embodiment is a so-called laptop personal computer, and comprises the first main body 2 in a flat rectangular shape and a second main body 3 in a flat rectangular shape. The first main body 2 and the second main body 3 are connected with each other via a hinge mechanism 4, so as to be rotatable around a rotation axis Ax relative to each other between an unfolded state illustrated in FIG. 1 and a folded state not illustrated.

The first main body 2 comprises a keyboard 5 serving as an input operation module. The keyboard 5 is exposed on a surface 2b serving as an outer surface of a housing 2a. The second main body 3 comprises a display 6 such as a liquid crystal display (LCD). The display 6 is exposed on a surface 3b serving as an outer surface of a housing 3a. In an unfolded state illustrated in FIG. 1, the keyboard 5, the display 6, and the like are exposed, thereby allowing the user to use the electronic device 1. In a folded state, the surfaces 2b and 3b closely face each other, and the keyboard 5, the display 6, and the like are hidden by the housings 2a and 3a.

Figure 2:
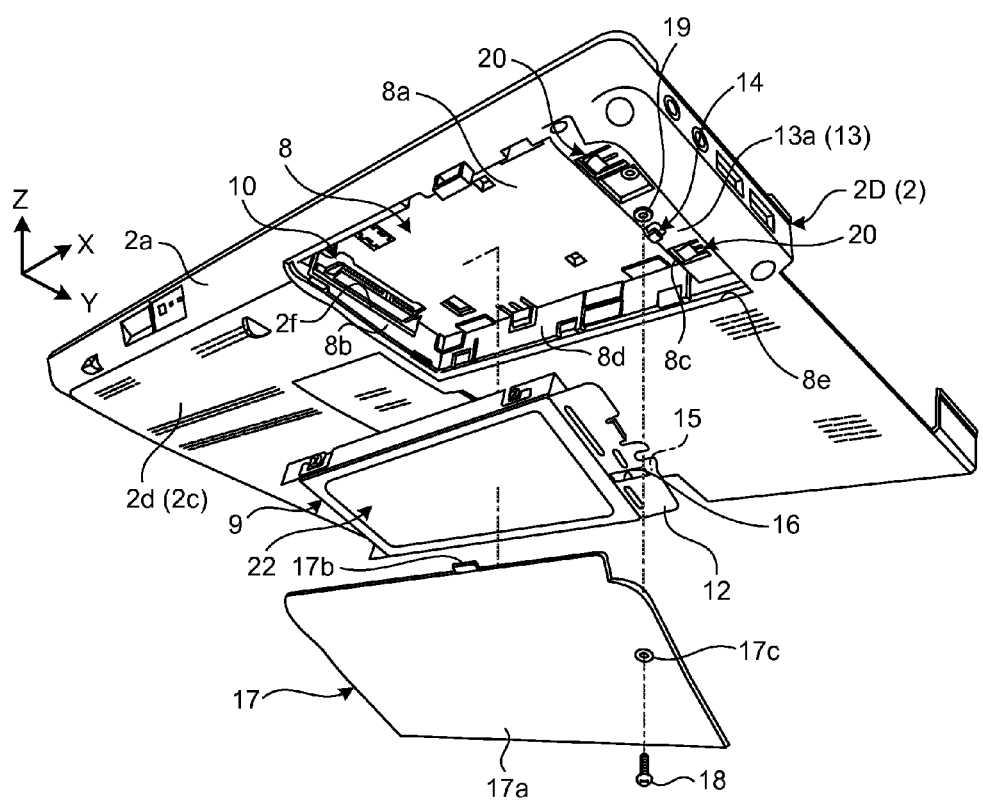
FIG. 2 is an exemplary exploded perspective view of the electronic device in the embodiment.

As illustrated in FIG. 2, a bottom wall 2c of a lower housing 2D of the first main body 2 comprises a recess portion 8 in the thickness direction (Z direction) of the first main body 2. The recess portion 8 comprises a rectangular shape in a plan view in the thickness direction (Z direction). A hard disk drive (HDD) unit 9 as a component is housed in the recess portion 8. In the embodiment, the recess portion 8 corresponds to a component container. The HDD unit 9 is formed in a flat rectangular parallelepiped shape.

A bottom surface 8a of the recess portion 8 is formed in a rectangular shape in a plan view. A connector 10 serving as a second connector is disposed at a side surface 8b at one end side of the recess portion 8 in the X direction. The connector 10 is fixed to a substrate 25 (not illustrated in FIG. 2; see FIG. 10) housed in the housing 2a of the first main body 2, and is exposed toward an inside of the recess portion 8 from an opening 2f formed on the side surface 8b. In the present embodiment, the connector 10 is formed as a flat female connector elongated in the Y direction, and comprises a plurality of terminals (not illustrated) aligned in the Y direction.

Figure 3:
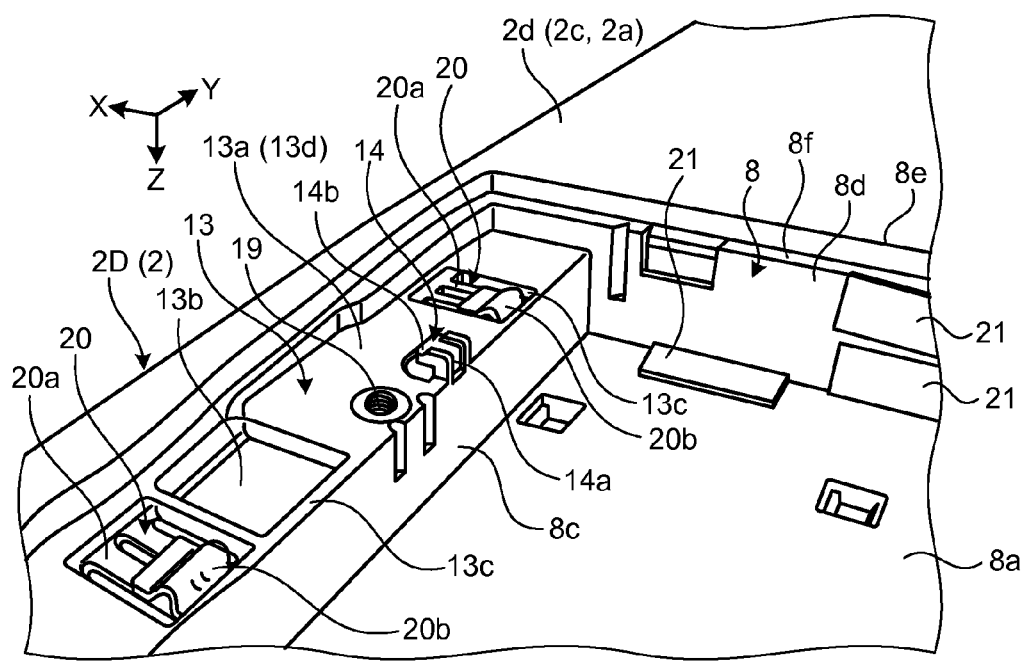
FIG. 3 is an exemplary perspective view of a part of a component container of the electronic device in the embodiment.

A step portion 13 is formed at the other end side of the recess portion 8 in the X direction. As illustrated in FIG. 3, a distance to a top surface 13a of the step portion 13 from an opening edge 8e (bottom surface 2d serving as an outer surface of the bottom wall 2c) of the recess portion 8, is shallower than a distance to the bottom surface 8a from the opening edge 8e. The top surface 13a is in parallel with the bottom surface 8a, and is elongated in the Y direction. A side surface 8c (FIG. 3) at the other end side of the recess portion 8 is formed between the top surface 13a and the bottom surface 8a.

The HDD unit 9 comprises a bracket 12 that comes into contact with the top surface 13a of the step portion 13 when the HDD unit 9 is housed in the recess portion 8. The bracket 12 is formed in a plate shape. The HDD unit 9 also comprises a connector 11 (not illustrated in FIG. 2; see FIG. 5 and the like) serving as a first connector on a side opposite to the side at which the bracket 12 is formed. The connector 11 is a flat male connector elongated in the Y direction, and comprises a plurality of terminals (not illustrated) aligned in the Y direction. When the connector 11 is attached to the connector 10, an electrical circuit in the HDD unit 9 and an electrical circuit in the first main body 2 are electrically connected through the terminals. The attachment direction of the connectors 10 and 11 is in the X direction.

The step portion 13 of the first main body 2 comprises a second engage portion 14 in a hook shape. The bracket 12 of the HDD unit 9 has a slit 16 penetrating through the bracket 12 in the vertical direction (front-to-back direction of the plate-shaped bracket 12). When the HDD unit 9 is housed in the recess portion 8 and the connectors 10 and 11 are attached to each other, the second engage portion 14 that has penetrated downwards through the slit 16 from above and a first engage portion 15 serving as an edge of the slit 16 in the longitudinal direction (X direction) are engaged with each other. In other words, in the present embodiment, the first engage portion 15 of the HDD unit 9 engages with the second engage portion 14 of the first main body 2 at the other end side in the X direction when the connector 10 of the first main body 2 and the connector 11 of the HDD unit 9 are attached to each other at one end side of the recess portion 8 in the X direction. In other words, in this state, the HDD unit 9 is supported by the first main body 2 at two points separated in the X direction (attachment direction of the connectors 10 and 11) (supported at the opposite ends).

The recess portion 8 is covered by a lid member 17 when the HDD unit 9 is housed in the recess portion 8. The lid member 17 is fixed to the first main body 2 with a screw 18 serving as a fixture. The screw 18 penetrates through a through hole 17c formed on the lid member 17 and a notch 12a serving as a penetration portion formed on the bracket 12. In other words, the screw 18 fixes the bracket 12, as well as the lid member 17, to the first main body 2. The top surface 13a of the step portion 13 comprises a female screw hole 19 serving as a fixed portion at which the screw 18 is fixed. The lid member 17 comprises a clip 17b used for engaging with the first main body 2. The lid member 17 can be temporarily held by the first main body 2 before the lid member 17 is fixed to the first main body 2 with the screw 18 by engaging the clip 17b with the first main body 2.

As illustrated in FIG. 2, the recess portion 8 is opened to a curved area on the bottom surface 2d serving as an outer surface of the housing 2a. When the lid member 17 is attached on the housing 2a, the outer surface 17a of the lid member 17 is formed in a curved shape continuous to the bottom surface 2d of the housing 2a. In other words, in the present embodiment, the bottom surface 2d of the housing 2a and the outer surface 17a of the lid member 17 form a continuous curved surface. With such a structure, the rigidity of the lid member 17 is improved because the lid member 17 is formed in a curved shape. Furthermore, non-smooth appearance can be reduced and the exterior appearance can be improved compared with a structure in which the bottom surface 2d is flat and a curved portion is only formed on the lid member 17.

Figure 4:
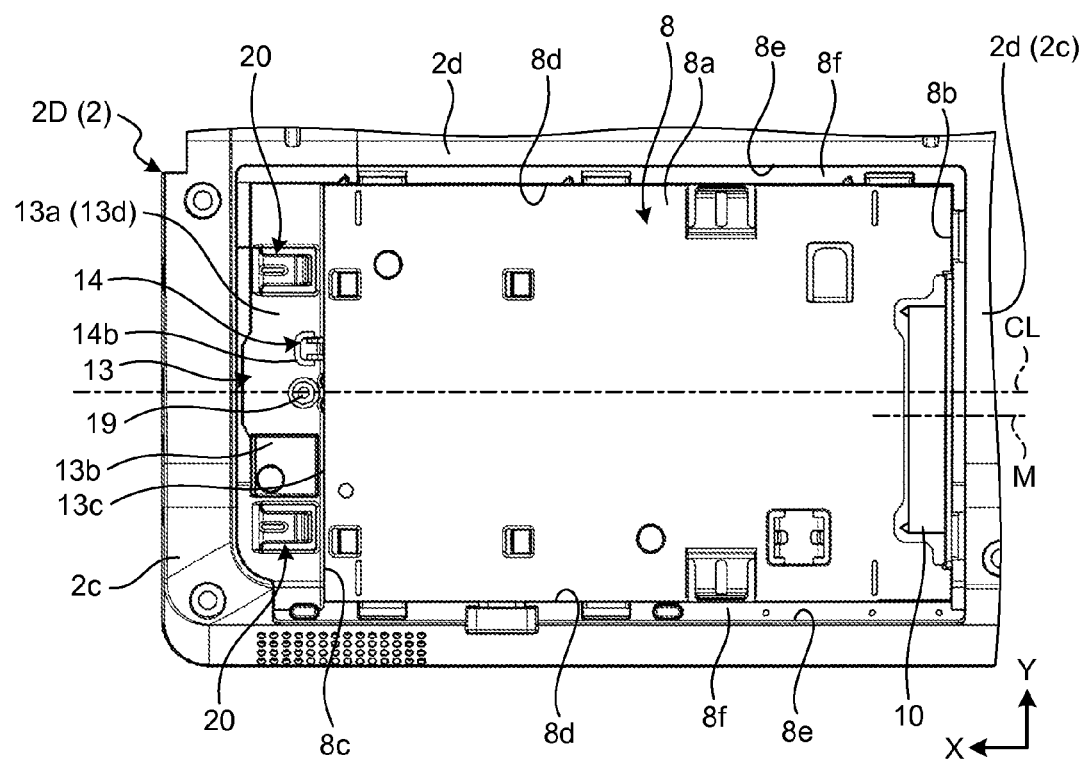
FIG. 4 is an exemplary plan view of a part of the component container of the electronic device in the embodiment.

The structure of the recess portion 8 serving as a component container will be described with reference to FIGS. 3, 4, and the like. As illustrated in FIG. 4, the recess portion 8 is formed in a rectangular shape with longer side in the X direction and shorter side in the Y direction when viewed into the thickness direction (Z direction) of the first main body 2 in a plan view. Side surfaces 8b, 8c, 8d, and 8d around the bottom surface 8a are perpendicular to the bottom surface 8a. An annular step portion 8f lower than the opening edge 8e by one step is formed at an inner periphery of the opening edge 8e. A periphery portion of the lid member 17 is mounted on the annular step portion 8f. The housing 2a is molded, for example, of a synthetic resin material or a metallic material.

As illustrated in FIG. 3, the second engage portion 14 is provided at a boundary portion between the top surface 13a of the step portion 13 and the side surface 8c. The second engage portion 14 comprises a projection 14a projected above the top surface 13a of the step portion 13 and a clip 14b bent at an end of the projection 14a and extending toward a side opposite to the connector 10 in the X direction. The female screw hole 19 serving as a fixed portion is formed on the top surface 13a of the step portion 13.

As illustrated in FIG. 4, the female screw hole 19 is formed on a center line CL of the recess portion 8 in the X direction. The second engage portion 14 is arranged at one side of the center line CL in the Y direction (rear side in the depth direction; upper side in FIG. 4). The connector 10 (center M of the connector 10 in the width direction (Y direction)) is arranged at other side of the center line CL in the Y direction (front side in the depth direction; lower side in FIG. 4).

As illustrated in FIGS. 3 and 4, the top surface 13a of the step portion 13 has a concave groove 13b in a rectangular shape in a plan view. A clip-shaped projection 12b formed on the bracket 12 of the HDD unit 9 is housed in the concave groove 13b. The concave groove 13b is disposed on the side opposite to the second engage portion 14 across the center line CL of the recess portion 8 in the X direction.

As illustrated in FIGS. 3 and 4, the top surface 13a of the step portion 13 comprises an elastic contact portion 20 that elastically comes into contact with the bracket 12. In the present embodiment, the elastic contact portion 20 is formed as an arm with a base portion provided at a side opposite to the connector 10 (left side in FIGS. 3 and 4). The elastic contact portion 20 is formed by removing a ceiling 13d of the step portion 13 forming the top surface 13a in a C-shape. The elastic contact portion 20 comprises an arm 20a extending toward the connector 10 from the side opposite to the connector 10. An end portion 20b of the arm 20a is projected slightly toward the top surface 13a. The end portion 20b is made of a conductor and is electrically connected to a ground electrode in the housing 2a through wiring, which is not illustrated.

As illustrated in FIG. 3, buffer members 21 are placed on the bottom surface 8a and the side surface 8d of the recess portion 8. The buffer members 21 lie between the recess portion 8 and the HDD unit 9 when the HDD unit 9 is housed in the recess portion 8. At least a part of the buffer members 21 is made of an elastic (flexible) material such as elastomer and sponge. The buffer members 21 may be placed on the bottom surface 8a and the side surface 8d, for example, by adhesion.

Figure 5:
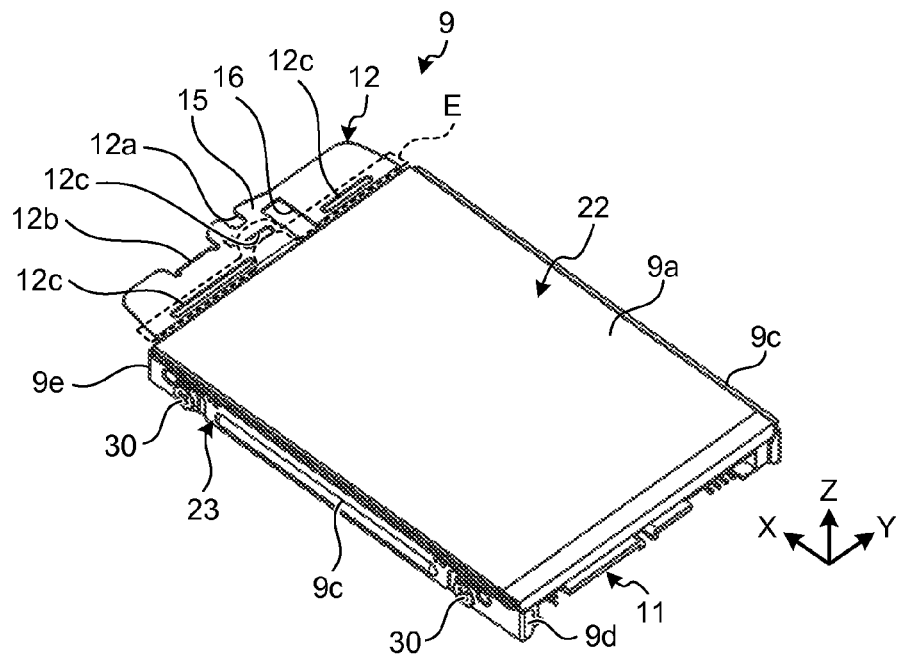
FIG. 5 is an exemplary perspective view of a component to be installed in the electronic device in the embodiment.
Figure 6:
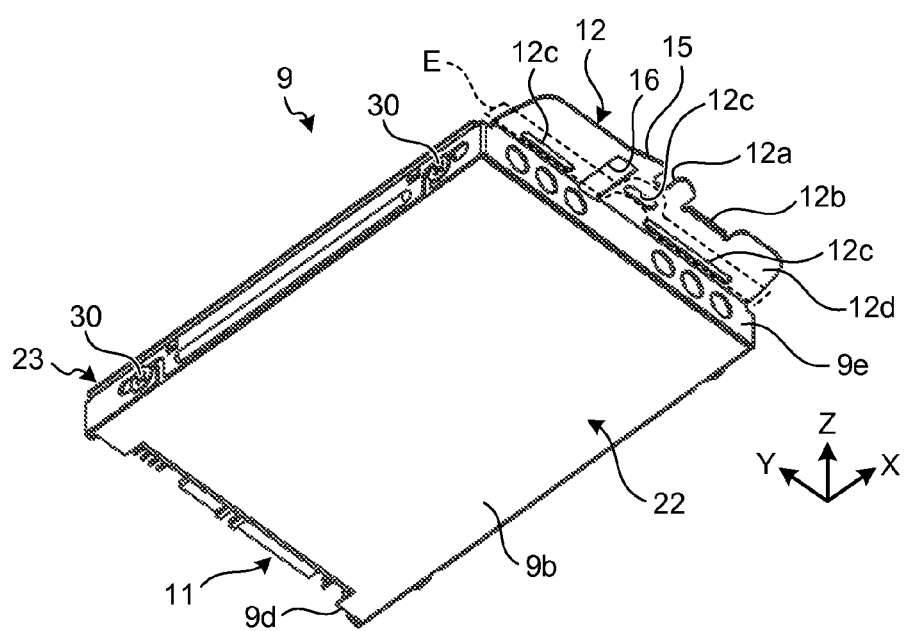
FIG. 6 is an exemplary perspective view of the component when viewed from a different angle in the embodiment.
Figure 7:
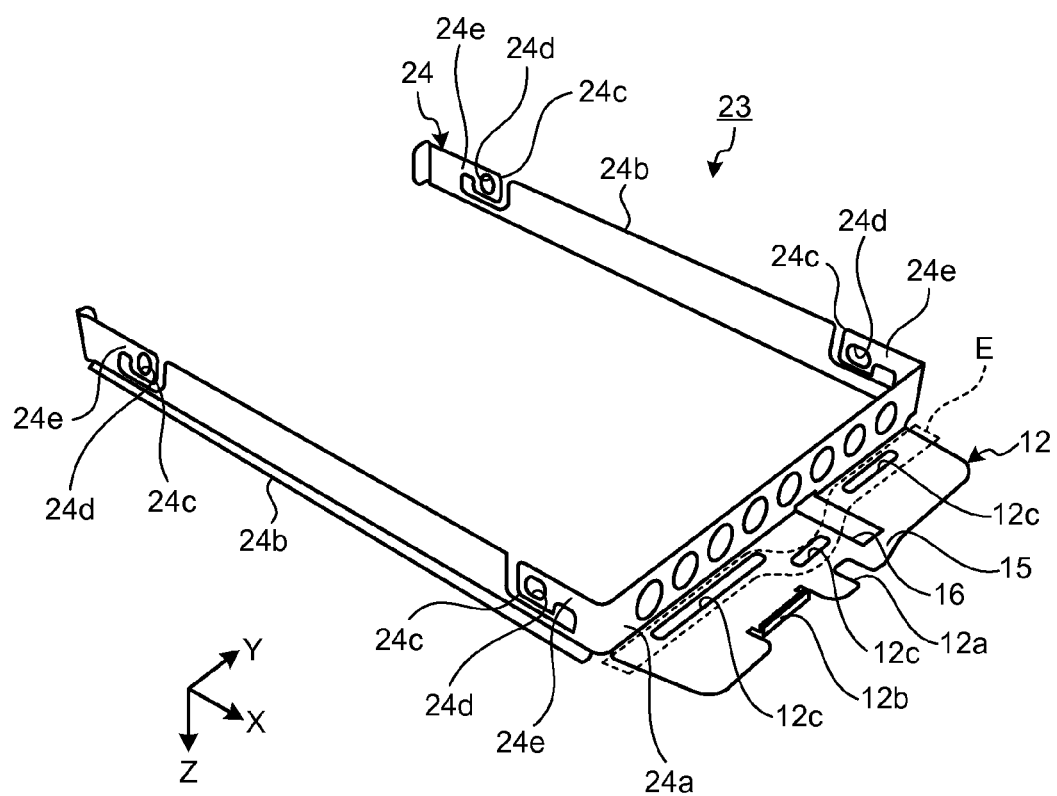
FIG. 7 is an exemplary perspective view of a frame of the component in the embodiment.

The structure of the HDD unit 9 as a component is described with reference to FIGS. 5 to 7 and the like. As illustrated in FIGS. 5 and 6, an upper surface 9a and a bottom surface 9b of the HDD unit 9 are formed in rectangular shapes and the HDD unit 9 is formed thin and flat in the direction (thickness direction; Z direction when the HDD unit 9 is installed) perpendicular to the upper surface 9a and the bottom surface 9b. When the HDD unit 9 is installed in the recess portion 8, the upper surface 9a faces the bottom surface 8a of the recess portion 8, the side surfaces 9c and 9c face the side surfaces 8d and 8d of the recess portion 8, and a rear surface 12d of the bracket 12 faces the top surface 13a of the step portion 13. The connector 11 at a side surface 9d is fitted and attached to the connector 10 on the first main body 2 facing the recess portion 8. The attachment direction of the connectors 10 and 11 is in the longitudinal direction (X direction) of the HDD unit 9 and is in the lower right direction in FIG. 5 and in the lower left direction in FIG. 6.

The bracket 12 is projected outward from a side surface 9e at the upper surface 9a side, along the upper surface 9a. The side surface 9e is opposite to the side surface 9d at which the connector 11 is formed. The bracket 12 is formed in a plate shape. The notch 12a serving as a penetration portion through which the screw 18 serving as a fixture passes is formed at an edge of an end side of the bracket 12. The slit 16 extending in the attachment direction (X direction) of the connectors 10 and 11 is formed on the bracket 12 with a constant width. The bracket 12 also comprises a clip-shaped projection 12b whose edge at the end side is cut and raised toward the bottom surface 9b. The bracket 12 also comprises a plurality of slits 12c elongated along the side surface 9e (along the Y direction). The slits 12c form an easily deformable portion E that is relatively easily deformed compared with the other parts.

In the present embodiment, the HDD unit 9 comprises an HDD 22 and a frame 23. As illustrated in FIG. 7, the frame 23 integrally comprises an enclosure 24 and the bracket 12. The enclosure 24 comprises three strip parts 24a, 24b, and 24b formed in a C-shape and surrounds the exterior of at least a part of the HDD 22 serving as a component main body. The strip parts 24a, 24b, and 24b come into contact with respective side surfaces of the HDD 22. The enclosure 24 also comprises attachment portions 24c each having a penetration portion 24d through which a screw 30 (see FIGS. 5 and 6) serving as a fixture for fixing the HDD 22 and the frame 23 passes. The attachment portions 24c are each connected to the strip part 24b through an arm 24e. The frame 23 is preferably formed of a conductive material such as a metal material.

Figure 8:
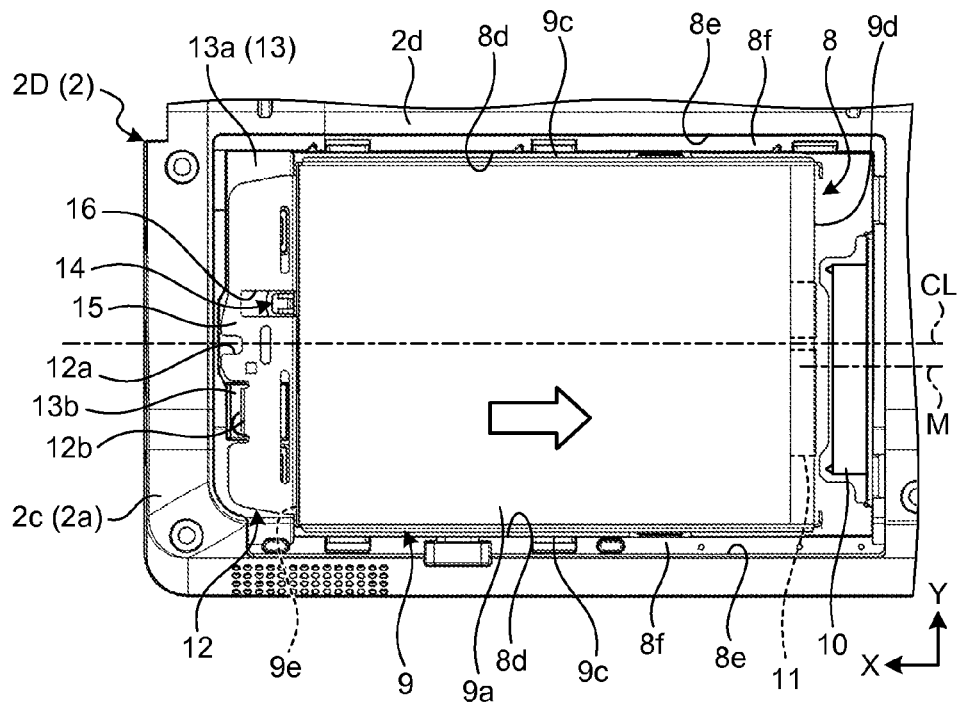
FIG. 8 is an exemplary plan view when the component is housed in the component container, but before connectors are fitted to each other in the embodiment.
Figure 9:
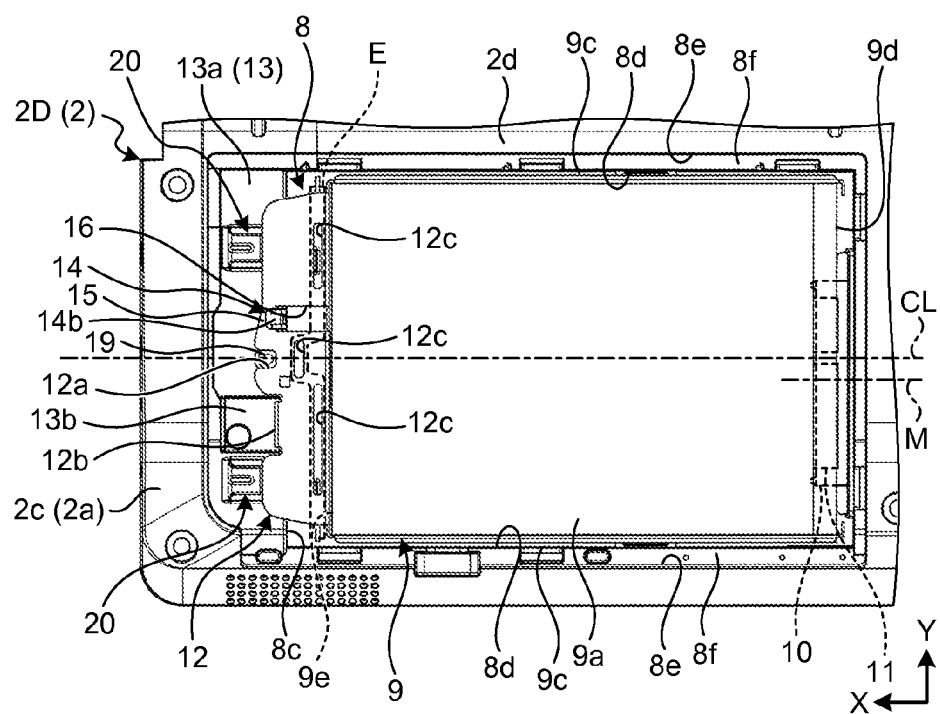
FIG. 9 is an exemplary plan view when the component is housed in the component container, and after the connectors are fitted to each other in the embodiment.

With reference to FIGS. 2, 8, and 9, for example, an installation of the HDD unit 9 as a component on the first main body 2 will be described. As illustrated in FIG. 2, an operator inserts the HDD unit 9 into the recess portion 8 from below in the Z direction. As illustrated in FIG. 8, when the HDD unit 9 is first inserted into the recess portion 8, the HDD unit 9 is placed on the side opposite to the connector 10 in the recess portion 8. The rear surface 12d (see FIG. 6) of the bracket 12 comes into contact with the top surface 13a of the step portion 13, and the second engage portion 14 penetrates through the slit 16. The width of the second engage portion 14 is slightly smaller than the width of the slit 16.

The operator then slides the HDD unit 9 toward the side of the connector 10 in the X direction (right side in FIGS. 8 and 9) while pressing the HDD unit 9 against the bottom of the recess portion 8 (side of the bottom surface 8a). Accordingly, as illustrated in FIG. 9, the connector 11 is attached to the connector 10 and the clip 14b of the second engage portion 14 and the first engage portion 15 serving as an edge of the slit 16 on the side opposite to the connector 11 are engaged with each other at the opposite side. In this manner, the HDD unit 9 is accommodated and temporarily held in the recess portion 8 (the HDD unit 9 is not fixed with the screw 18 serving as a fixture).

When the HDD unit 9 is moved from the state in FIG. 8 to the state in FIG. 9, the second engage portion 14 is moved relative to the HDD unit 9 while the second engage portion 14 is guided along the slit 16. In other words, in the present embodiment, the slit 16 corresponds to a guide portion. The clip 14b of the second engage portion 14 is projected toward the connector 10 in the longitudinal direction (X direction) of the slit 16. Accordingly, the clip 14b of the second engage portion 14 is prevented from being interfered with the bracket 12 when the HDD unit 9 is inserted into the recess portion 8 in the Z direction. If the operator moves the HDD unit 9 in the longitudinal direction (X direction) of the slit 16 to attach the connectors 10 and 11 with each other, the clip 14b is protruded from the slit 16 in the longitudinal direction. In other words, in the present embodiment, the operator first inserts the HDD unit 9 into the recess portion 8 by moving the HDD unit 9 in the Z direction, and then moves the HDD unit 9 toward the connector 10 in the X direction. Consequently, the HDD unit 9 can be installed in the first main body 2 relatively easily. The HDD unit 9 may also be guided by the bottom surface 8a or the side surface 8d of the recess portion to move in the attachment direction (X direction) of the connectors 10 and 11. Eventually, the bracket 12 is fixed to the first main body 2 with the screw 18 serving as a fixture. Even if the bracket 12 is not fixed to the first main body 2 with the screw 18, the HDD unit 9 is supported by the first main body 2 at the both end sides in the longitudinal direction. Accordingly, the HDD unit 9 can be prevented from falling from the first main body 2 to be, for example, damaged when initially installing the HDD unit 9 on the first main body 2 or replacing the HDD unit 9 for maintenance and the like even when the screw 18 serving as a fixture is not yet provided or even before the screw 18 is unscrewed.

The clip-shaped projection 12b is inserted into the concave groove 13b when the HDD unit 9 is initially inserted into the recess portion 8. The clip-shaped projection 12b also moves toward the connector 10 in the X direction along the concave groove 13b when the HDD unit 9 is moved toward the connector 10 in the X direction, or in other words, when the HDD unit 9 is moved from the state in FIG. 8 to the state in FIG. 9. At the state of FIG. 9, the clip-shaped projection 12b is engaged with an engage portion 13c formed at the end of the concave groove 13b on the side of the connector 10. In the present embodiment, the fitting location (fitting amount) of the connectors 10 and 11 is defined by the engagement of the clip-shaped projection 12b with the engage portion 13c.

The fitting location (fitting amount) of the connectors 10 and 11 may also be defined by the engagement of the first engage portion 15 with the second engage portion 14. However, in the present embodiment, the first engage portion 15 and the second engage portion 14 are provided mainly to engage the first engage portion 15 and the second engage portion 14 in the direction (Z direction) of restricting the HDD unit 9 from being disengaged from the recess portion 8. Consequently, the fitting location (fitting amount) of the connectors 10 and 11 is mainly defined by the engagement of the clip-shaped projection 12b with the engage portion 13c. The widths of the clip-shaped projection 12b and the engage portion 13c in a plan view are larger than the widths of the second engage portion 14 and the first engage portion 15. The connectors 10 and 11 can be prevented from being obliquely fitted with each other because the flat portions of the clip-shaped projection 12b and the engage portion 13c are pressed against each other.

The female screw hole 19 serving as a fixed portion is exposed from the notch 12a serving as a penetration portion in a plan view when the HDD unit 9 is moved toward the connector 10 in the X direction until the connector 11 is attached to the connector 10, as illustrated in FIG. 9. Accordingly, the bracket 12 and the lid member 17 are fixed to the step portion 13 (housing 2a) by providing the screw 18 serving as a fixture into the female screw hole 19 at this state. In the present embodiment, the female screw hole 19 is blocked by the bracket 12 at the state in FIG. 8 and the female screw hole 19 is exposed from the notch 12a at the state in FIG. 9, or in other words, when the HDD unit 9 is installed in the recess portion 8 at a predetermined state and when the connector 11 is attached to the connector 10 at a predetermined state. Consequently, it is possible to prevent the lid member 17 from being attached on the housing 2a with the screw 18 when the HDD unit 9 is installed in the recess portion 8 but not fitted properly.

As illustrated in FIG. 9, in the present embodiment, the notch 12a serving as a penetration portion is disposed on the center line CL in the attachment direction (X direction) of the connectors 10 and 11 of the HDD unit 9 in a plan view. If a position on the bracket 12 off from a center of a short-side direction (Y direction) of the HDD unit 9 in the short-side direction is fixed to the step portion 13 (housing 2a), a gap between the bracket 12 and the step portion 13 may be increased, and vibrations may easily occur because a moment arm from the fixed point becomes long. In this regard, in the present embodiment, a position of the bracket 12 close to the center in the short-side direction (Y direction) of the HDD unit 9 can be fixed to the step portion 13 (housing 2a). Accordingly, the fixing can be more stable compared with when an area far from the center is fixed.

In the present embodiment, the slit 16 serving as a guide portion is arranged at one side (upper side in FIG. 9) of the center line CL in the Y direction, and the connector 11 (center M of the connector 11 in the width direction (Y direction)) is arranged at the other side (front side in the depth direction; lower side in FIG. 9) of the center line CL in the Y direction. When the HDD unit 9 is temporarily held and is not fixed with the screw 18 (particularly, when the connectors 10 and 11 are not tightly fitted to each other), the HDD unit 9 is supported by the housing 2a mainly at two locations, i.e., at the engagement location of the second engage portion 14 and the first engage portion 15 and at the fitting location of the connectors 10 and 11. At this time, if the slit 16 and the connector 11 are both shifted to one side from the center line CL in the Y direction, the mass on the other side in the Y direction is increased relative to the support points of the two locations. Accordingly, the posture of the HDD unit 9 relative to the housing 2a is likely to be unstable. For example, the HDD unit 9 may be tilted relative to the housing 2a. In this regard, in the present embodiment, the slit 16 and the connector 11 are arranged at each of the sides opposite from each other relative to the center line CL. Consequently, it is possible to prevent the unbalanced mass, thereby temporarily holding the HDD unit 9 more stably relative to the housing 2a. In the present embodiment, the center line CL of the HDD unit 9 in the X direction is matched with the center line CL of the recess portion 8 in the X direction in a plan view.

When the HDD unit 9 is fixed to the step portion 13 (housing 2a), as illustrated in FIG. 9, the easily deformable portion E of the bracket 12 is disposed between the step portion 13 and the side surface 9e of the HDD unit 9 on the side opposite to the connector 11. Accordingly, the load applied to the HDD 22 from the step portion 13 through the bracket 12 is absorbed by the deformation (elastic deformation or plastic deformation) of the easily deformable portion E, thereby improving protection performance of the HDD 22.

The bracket 12 and the end portion 20b of the elastic contact portion 20 come into contact with each other when the HDD unit 9 is fixed to the step portion 13 (housing 2a), as illustrated in FIG. 9. Accordingly, a difference in ground potential between the HDD unit 9 and the first main body 2 can be reduced by forming the bracket 12 with a conductive material (such as a metal material). Consequently, it is possible to prevent disadvantages (such as occurrence of noise) caused by a difference in ground potential.

Figure 10:
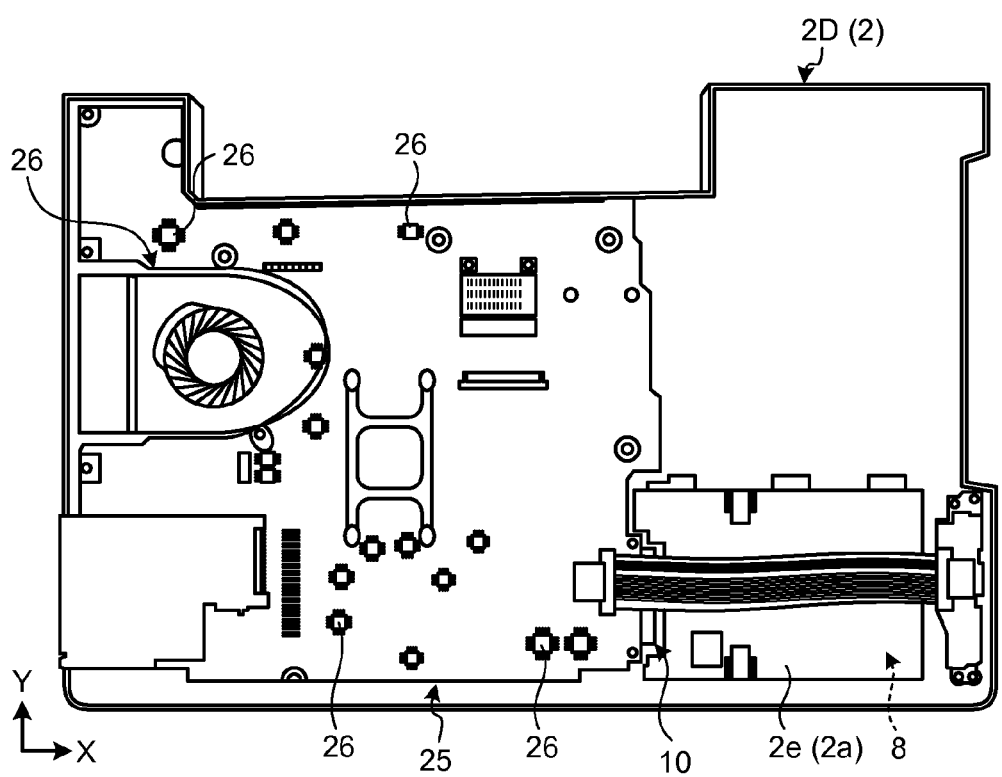
FIG. 10 is an exemplary plan view of an interior of a main body of the electronic device in the embodiment.

As illustrated in FIG. 10, a plurality of electronic components 26, the substrate 25 on which the electronic components 26 are mounted, and the like, are accommodated in the lower housing 2D (housing 2a) of the first main body 2. The electronic components 26 and the substrate 25 are both fixed to the lower housing 2D. A rectangular shaped bottom wall 2e that forms the recess portion 8 is illustrated at the lower right side in FIG. 10. In the present embodiment, the bottom wall 2e, the side wall, and the like of the recess portion 8 are formed as a part of the lower housing 2D. In the present embodiment, the connector 10 is fixed to a part of the edge of the substrate 25. In a structure in which the connector 10 is connected to the substrate 25 with a harness, the supporting state of the HDD unit 9 becomes slightly unstable. In regard to this point, in the present embodiment, because the connector 10 is tightly fixed to the substrate 25, the HDD unit 9 can be supported by the connector 10 more stably.

Figure 11:
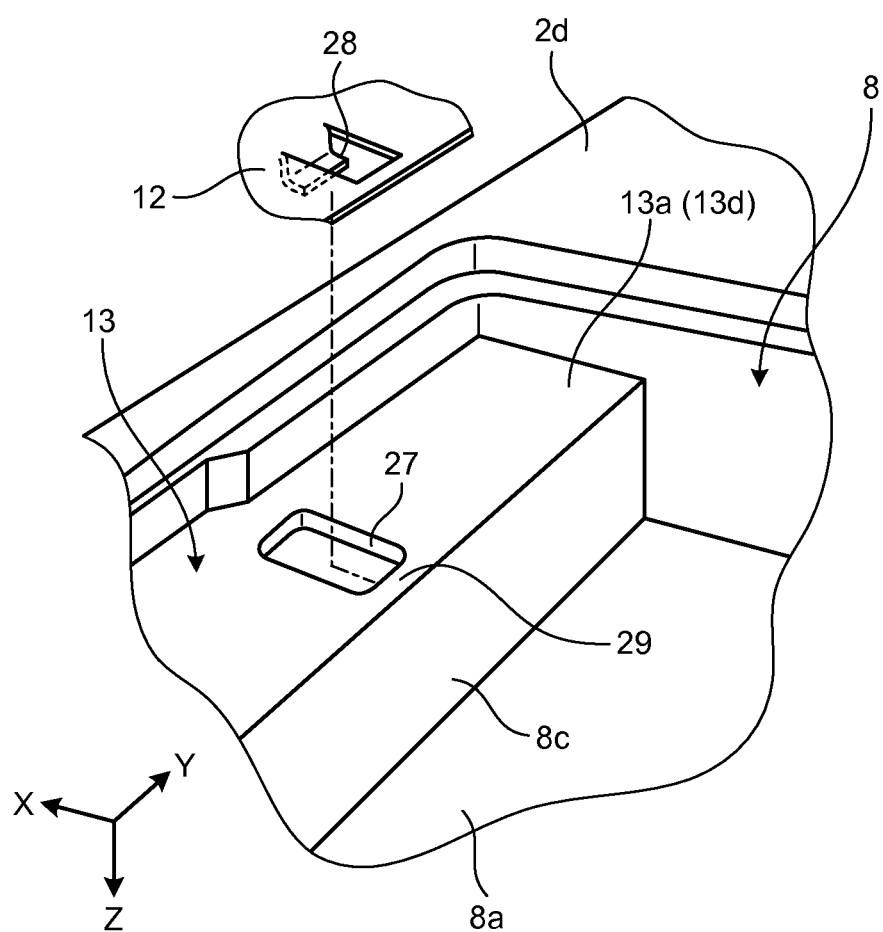
FIG. 11 is an exemplary perspective view of apart of a component container of an electronic device according to a modification of the embodiment.

In a modification illustrated in FIG. 11, the ceiling 13d serving as the top surface 13a of the step portion 13 has a slit 27 serving as a guide portion extended in the fitting direction of the connectors 10 and 11. The bracket 12 comprises a cut-and-raised clip serving as an engaging part 28. In this case, an edge of the slit 27 on the side of the connector 10 is an engaged part 29. With this modification, it is also possible to obtain the structure in which the HDD unit 9 is engaged with the housing 2a on the side opposite to the connector 11 (the engaging part 28 and the engaged part 29).

As described above, the electronic device 1 according to the present embodiment comprises: the first main body 2 having the recess portion 8 serving as a component container in which the HDD unit 9 as a component is installed; the connector 10 mounted on the first main body 2 so as to face the recess portion 8 and to be attached to the connector 11 mounted on one end of the HDD unit 9; and the second engage portion 14 mounted on the first main body 2 and engaging with the first engage portion 15 mounted on the other end of the HDD unit 9. Accordingly, the HDD unit 9 can be stably supported by the first main body 2 at two locations: the first of which is at the fitting location of the connectors 10 and 11; and the second of which is at the engagement location of the first engage portion 15 and the second engage portion 14. With such a structure, the HDD unit 9 can be temporarily held by the first main body 2 more stably when the screw 18 serving as a fixture is not provided into the female screw hole 19. Consequently, the HDD unit 9 can be prevented from being disengaged from the recess portion 8 to be, for example, damaged while the HDD unit 9 is being attached to or detached from the recess portion 8. the number of the engagement locations can be reduced because the connectors 10 and 11 are used to support the HDD unit 9, thereby the apparatus structure is downsized and the manufacturing cost is reduced.

In the present embodiment, the connector 10 is fixed to the first main body 2 (substrate 25 in the present embodiment).

Accordingly, since the connectors 10 and 11 are fitted to each other, the HDD unit 9 can be supported more stably. Further, in comparison to the case when the connector 10 is not fixed to the first main body 2, the connector 10 of the embodiment is fixed to the first main body 2 by guiding the HDD unit 9 by the first main body 2 while moving the HDD unit 9. Accordingly, the connector 10 and the connector 11 can more easily and securely be fitted with each other.

In the present embodiment, the first main body 2 comprises the housing 2a and the lid member 17 for covering the opening of the recess portion 8 formed on the housing 2a. The lid member 17 is attached on the first main body 2 with the HDD unit 9 using the screw 18 serving as a fixture. Accordingly, in comparison to the case when the lid member 17 and the HDD unit 9 are fixed to the first main body using separate fixtures, the number of components can be reduced. Therefore, the manufacturing cost is further reduced.

In the present embodiment, the recess portion 8 is opened to the curved area on the bottom surface 2d serving as an outer surface of the housing 2a. The outer surface 17a of the lid member 17 has a curved shape that is continuous to the bottom surface 2d when the lid member 17 is attached on the housing 2a. Accordingly, the rigidity of the lid member 17 can be improved because the lid member 17 is formed in a curved shape. Non-smooth appearance can be reduced and the exterior appearance can be improved compared with a structure in which a curved portion is only formed on the lid member 17.

In the present embodiment, the recess portion 8 comprises the step portion 13 comprising the second engage portion 14. The step portion 13 is provided on the end side of the recess portion 8 at which the connector 10 is not disposed. The step portion 13 serves as a bracket contact portion that is brought into contact with the bracket 12 comprising the first engage portion 15 of the HDD unit 9. Accordingly, the second engage portion 14 and the first engage portion 15 can be formed in a relatively simple manner by using the bracket 12 and the step portion 13 formed on the side opposite to the connectors 10 and 11. The step portion 13 and the bracket 12 comprises configurations such as the second engage portion 14 and the first engage portion 15, respectively. Thus, the configurations can be closely arranged to the side of the opening edge 8e of the recess portion 8. Consequently, the HDD unit 9 can be handled easily compared to the case when the configurations are arranged closer to the bottom of the recess portion 8. As a result, the attachment, detachment, and the like of the HDD unit 9 can be performed more easily.

A configuration for guiding the HDD unit 9 in the attachment direction, a configuration for fixing the HDD unit 9 to the first main body 2, a configuration for regulating the inserting amount of the connector 11 into the connector 10, a configuration to provide common a ground potential for the HDD unit 9 and the first main body 2, a configuration for relieving the impact force on the HDD unit 9, and the like, can be obtained in a relatively simple manner by using the bracket 12 and the step portion 13. Heat dissipation of the HDD unit 9 can be improved by forming the bracket 12 with a material having a relatively high thermal conductivity such as a metal material.

In the present embodiment, the bracket 12 has the slit 16 serving as a guide portion that relatively guides the second engage portion 14 in the attachment direction of the connector 11 and the connector 10. In the modification, the step portion 13 has the slit 27 serving as a guide portion that relatively guides the engaging part 28 in the attachment direction of the connector 11 and the connector 10. Accordingly, a structure in which the HDD unit 9 is moved relative to the first main body 2 until the connector 11 is inserted into the connector 10 can be obtained in a relatively simple manner by using the bracket 12 and the step portion 13. In particular, in the embodiment, the guide portion can be easily formed as the slit 16 penetrating through the front and rear of the bracket 12, and the edge of the slit 16 in the longitudinal direction can be used as the first engage portion 15 because the bracket 12 is formed in a plate shape.

In the present embodiment, the bracket 12 has the notch 12a serving as a penetration portion through which the screw 18 serving as a fixture for attaching the bracket 12 on the step portion 13 serving as a bracket contacting module penetrates. The notch 12a is disposed closer to the center line CL of the HDD 22 in the attachment direction than the slit 16 serving as a guide portion when viewed in the thickness direction of the HDD 22 serving as a component main body. Accordingly, the HDD unit 9 can be fixed to the first main body 2 more stably compared to the case when the notch 12a as a penetration portion through which the fixture penetrates is disposed at a position away from the center line CL.

In the present embodiment, the slit 16 is arranged at the one side of the center line CL and the connector 11 is arranged at the other side of the center line CL when viewed from the thickness direction. Accordingly, the first main body 2 can support (temporarily hold) the HDD unit 9 more stably. The positions of the slit 16 and the connector 11 may be reversed from that in the present embodiment.

In the present embodiment, the HDD unit 9 comprises the frame 23 that surrounds the exterior of at least a part of the HDD 22 serving as a component main body and the bracket 12 is integrally formed with the frame 23. Accordingly, the structure can be more simplified compared to the case when the frame 23 and the bracket 12 are separately attached on the HDD 22. The rigidity of the HDD unit 9 can also be increased.

In the present embodiment, the easily deformable portion E that is relatively easily deformed by the applied load is formed at the area between the portion where the bracket 12 comes into contact with the step portion 13 and the HDD 22 serving as a component main body when the HDD unit 9 is fixed to the first main body 2. Accordingly, the load applied to the HDD 22 from the step portion 13 through the bracket 12 can be absorbed by the deformation of the easily deformable portion E (elastic deformation or plastic deformation), thereby improving protection performance of the HDD 22. The easily deformable portion E may also be obtained by linearly forming a portion of which the thickness is reduced by forming the portion in a concave groove shape or by aligning through holes and concaves in a plurality of lines.

The aforementioned embodiment is applicable to for example components other than the HDD unit. Specification of location, size, shape, structure and the like of the component, the component container, the bracket, the step portion (bracket contacting module), the first engaging portion, the second engage portion, the guide portion, the penetration portion, and the like may also be suitably changed. The second connector may be connected to the substrate with a harness and the like. However, in this case, it is preferable to fix the harness to the main body relatively tightly so that the harness can support the component.

While certain embodiments have been described, these embodiments have been presented by way of example only, and are not intended to limit the scope of the inventions. Indeed, the novel device described herein may be embodied in a variety of other forms; furthermore, various omissions, substitutions and changes in the form of the device described herein may be made without departing from the spirit of the inventions. The accompanying claims and their equivalents are intended to cover such forms or modifications as would fall within the scope and spirit of the inventions.

What is claimed is:

1. An electronic device, comprising:
a component comprising a first end and a second end arranged at a position opposite to the first end;
a first connector provided at a position off from a center of a short-side direction of the component of the first end;
a housing comprising a container housing the component;
a second connector provided in the housing, and configured to be connected to the first connector;
a bracket provided at the second end, and comprising a penetration portion through which a fixture is configured to penetrate, the penetration portion being arranged close to the center of the short-side direction of the component, and a slit portion arranged at a position opposite to the first connector with respect to the penetration portion, the slit portion being along in a connection direction of the first and second connectors; and
a hook provided at the housing, and configured to be guided by the slit portion when the component is moved in the connection direction, and configured to be engaged with an end of the slit portion in a longitudinal direction.

2. The electronic device of claim 1, wherein
the housing comprises a recess portion as the container,
the recess portion comprises a step portion at a location opposite to the second connector, the step portion being brought into contact with the bracket, and
the step portion comprises the hook.

3. The electronic device of claim 1, wherein
the container is opened with respect to a curved area on an outer surface of the housing, and
an outer surface of a lid comprises a curved shape that is continuous to the outer surface of the housing when a lid is attached to the housing to cover an opened portion of the container formed on the housing.

4. The electronic device of claim 1, wherein the component further comprises
a frame covering an exterior of at least a portion of a main body of the component, and
the bracket is integrally formed with the frame.

5. The electronic device of claim 4, wherein the component further comprises an easily deformable portion provided at an area between the main body and a portion at which the bracket comes into contact with the housing when the component is fixed to the housing, the easily deformable portion being configured to be relatively easily deformed by an applied load.

6. An electronic device, comprising:
a component;
a bracket provided at the component;
a first connector provided at the component and arranged at a position off from a center of a short-side direction of the component;
a housing comprising a container housing the component;
a second connector provided in the housing, and configured to be connected to the first connector; and
an engaging portion provided at the housing,
wherein the bracket comprises a guide portion configured to guide the engaging portion in a connection direction of the first and second connectors at a position off from the center of the short-side direction of the component in a direction opposite to the first connector, and configured to be engaged with the engaging portion at an end of the guide portion.

* * * * *